(12) United States Patent
Beecham

(10) Patent No.: US 11,954,660 B1
(45) Date of Patent: Apr. 9, 2024

(54) METHOD AND COMPUTERIZED SYSTEM FOR ENHANCING ENJOYMENT OF SPORTS FOR FANS WHILE BENEFITING FINANCES OF ATHLETES

(71) Applicant: James E. Beecham, West Palm Beach, FL (US)

(72) Inventor: James E. Beecham, West Palm Beach, FL (US)

( * ) Notice: Subject to any disclaimer, the term of this patent is extended or adjusted under 35 U.S.C. 154(b) by 0 days.

(21) Appl. No.: 18/534,662

(22) Filed: Dec. 10, 2023

(51) Int. Cl.
*G06Q 20/12* (2012.01)
*G06Q 20/32* (2012.01)

(52) U.S. Cl.
CPC ......... *G06Q 20/12* (2013.01); *G06Q 20/3274* (2013.01)

(58) Field of Classification Search
None
See application file for complete search history.

(56) References Cited

U.S. PATENT DOCUMENTS

| 10,349,100 | B2* | 7/2019 | Perez | H04N 21/47202 |
| 11,291,916 | B2* | 4/2022 | Kurth | H04N 21/47202 |
| 2015/0040685 | A1* | 2/2015 | Nicholson | A61B 5/4064 |
| | | | | 73/862.51 |

* cited by examiner

*Primary Examiner* — Joseph W. King
(74) *Attorney, Agent, or Firm* — Christopher Pilling

(57) ABSTRACT

The invention introduces a method and system designed to augment sports fans' experience and simultaneously generate revenue for athletes. It involves a computerized platform for storing and accessing videos, which contain athletes sharing insights about their competitive season in sports like games, matches, or meets. The access to these videos is facilitated through either a URL for online viewing or a QR code embedded in a digital or printed format. A unique feature of this system is the video view availability monitoring display/selection grid. This grid showcases images of fans' favorite athletes on one axis and the corresponding games, matches, or meets on another, allowing users to easily select and view their preferred content. Athletes have the ability to upload multiple videos for the same event, with each video distinctly labeled with time, date, and explanatory notes.

12 Claims, 11 Drawing Sheets

METHOD AND COMPUTERIZED SYSTEM FOR ENHANCING ENJOYMENT OF SPORTS FOR FANS WHILE BENEFITING FINANCES OF ATHLETES

1. FIELD OF THE INVENTION

The present invention method and system regards sports information. More specifically, instant method and system regards organizing and delivering sports information to enhance enjoyment of sports for fans while providing a financial benefit to athletes.

BACKGROUND OF THE INVENTION

In the field of sports information, a sports fan faces a bewildering number of information sources which are often not specific to the fan's needs. Fans can read online posts regarding sports, view game footage videos online, and watch broadcast television to see games and sports analysis. However, when a fan wishes to timely access the competition-specific observations of his favorite athletes, access tends to be limited and poorly organized. While a fan might stumble across a broadcast of a press conference or catch an on-the-field post-game interview involving one of the fan's favorite athletes, such opportunities tend to be haphazard at best. Enjoyment of sports for such fans would be increased if organized and timely access to such information of favorite athletes could be provided at fan's discretion.

BRIEF SUMMARY OF THE INVENTION

In a preferred embodiment, instant invention comprises a computerized system for providing enhancement of enjoyment of sports for system-registered fans while benefiting the finances of system-registered athletes, said system comprising: at least one video stored in computer memory; at least one link to said stored video comprising at least one of a URL and a QR code; the contents of said stored video comprising the recorded appearance of a system-registered athlete speaking his observations of a sports event in which he competed; a monitoring function comprising an onscreen video view availability monitoring display/selection grid; at least one alert provided to a system-registered fan comprising said fan's use of said onscreen video view availability monitoring display/selection grid; at least one online purchase of a view of said stored video by said fan; and at least a share of said purchase funds provided to the said athlete whose recorded appearance comprises said video viewed.

In a preferred embodiment, instant invention alert comprises a change in appearance within said display/selection grid (see FIG. 1). For example, an identifier previously indicating no availability for a video by an athlete regarding a specific athletic event, said display changes in display appearance to comprise an indication of said video as being available. In a preferred embodiment, said alert can also comprise an email automatically sent to fan when said video becomes available, such as when athlete of video contents posts a link in system corresponding to the athlete whom fan has previously registered in system as of interest to said fan. In a preferred embodiment, said fan pays for the opportunity to view said video and said athlete receives at least a percentage or share of said fan's payment or similar distribution.

In a preferred embodiment, athletes use a function of said system to set his or her individually chosen prices for fans to pay (see FIG. 6) for a viewing of said athlete's videos. It is understood that the herein use of a single male pronoun can be interpreted as including all genders of humans. Optionally, an athlete can view a graphical representation within the system dashboard to inform the athlete of the sales volume of paid views of his videos.

In a preferred embodiment, a computer of instant invention system comprises a processor linked to memory, said memory comprising instructions executable by said processor. In a preferred embodiment, software programming comprises instructions which allow and enable the computerized functions within system as herein disclosed.

In a preferred embodiment, the athlete storing a video in YouTube will click the 'Unlisted' category for setting video visibility. In this way, the video will not be available in a search of YouTube or displayed in video collection of the channel. Only those viewers to whom instant invention system provides the link will have direct access.

In a preferred embodiment, instant invention comprises a communications network with linked mobile devices. In a preferred embodiment, instant invention comprises cloud computing enabling client devices to access data and applications over the internet from remote physical servers, databases, and computers. In a preferred embodiment, instant invention comprises registering within the computerized system a plurality of amateur athletes, said registering comprising a Brand Ambassador contract suitable to meet requirements undercurrent NIL guidelines.

In a preferred embodiment, instant invention allows system-registered athletes at least an opportunity to earn money while at least potentially building their respective fan bases by supplying video views to fans using instant invention method and system. In a preferred embodiment, system-registered athletes are instructed as to need for timely supply to the computerized system of instant invention by their timely posting of videos and the links thereto. Such timeliness relates to a schedule of games or other athletic events and fans' interest therein. In a preferred embodiment, timely can relate to within a few days prior to a game for pre-game athlete supply of pre-game video with link. In a preferred embodiment, timely can relate to within a few hours after completion of a game for post-game athlete supply of post-game video with link.

In a preferred embodiment, a registered fan user of the computerized system of the instant invention is allowed to designate one or more system-registered athletes, said designation allowing the programming of the system to place a representative image of said designated athlete on an onscreen video view availability monitoring display/selection grid. Said display allows fans to monitor the status of links posted by a fan-favored athlete and to be alerted when said athlete makes a new post of a video and link thereto. Said videos comprise said athlete speaking his observations regarding a sports event such as a game of an ongoing season of sports. Said display allows said fan to timely select for purchase a viewing of said linked video, such as near the time of play of said game or soon thereafter. Said view of said video can enhance the fan's enjoyment of the event, not least by providing a personalized account by a participant. Fans may feel a sense of pride and accomplishment when their team or favorite athlete wins a game or competition, and this can be particularly enjoyable when the fan watches and hears the winning athlete favorite speaking his or her observations about the competition. The fan, in purchasing a video view, can have options for said viewing. Said options can comprise an online viewing on the one hand or a fan's opportunity to download a printable file comprising a QR code scannable to provide a view of said video and a keepsake. Said downloaded and printed file can comprise, for at least some fans in regard to at least some athletes, a valued piece of sports memorabilia.

In a preferred embodiment, an athlete posting links to videos may wish to provide a plurality of videos for the same event or day of competition. To specifically identify such multiple postings for fans and allow orderly purchasing, the system allows athletes to assemble a listing wherein each of said postings comprises a corresponding time/date label or 'stamp', and an explanatory notation such as by typed input of the athlete describing the individual video contents. For example, when a track and field athlete has entered multiple race events within the said meet, said multiple races having heats during the same day or week, said athlete may record multiple corresponding videos regarding said multiple races with associated links posted within the system. The monitoring display/selection grid presented to the fan comprises access to said listings. For example, said monitoring display/selection grid comprises in a preferred embodiment a grid of buttons wherein said athlete's photo and the designation Meet assists in organizing for fan said access. When said athlete posts said link, a light turns on representing a lighted button in the said display/selection grid corresponding to said link and the linked video availability to fan purchase. Accordingly, the fan may select the desired video view. Said selection and purchase can comprise as online view if lighted button was so designated, or a download of an electronic file which fan can print to produce a card with QR code to scan as access to said video view where the lighted button was thus designated. For the multiple videos case in same meet, the initial button click yields the listing (see FIG. 7). For example, a sprinter in a track meet may enroll to run both the 100 meters race and the 200 meters race. Said athlete may record multiple corresponding videos and enter a plurality of corresponding links to the system. The display/selection grid provides the initial button, and the listing thus revealed provides the subsequent choices among the multiple videos. Selection among said plurality can be assisted by fan reading the associated notation and time stamp, as for example '100 meters heat 2' with time/date '1 Aug. 23 at 9:35 am' and '200 meters semi-final' with time/date '2 Aug. 23 at 5:24 pm' (see FIG. 7).

BRIEF DESCRIPTION OF THE FIGURES

Other features and advantages of the present invention will become apparent when the following detailed description is read in conjunction with the accompanying drawings, in which:

FIG. 1B is a schematic of an onscreen display/selection grid for a 'Match' sport in a preferred embodiment.

FIG. 1C is a schematic of an onscreen display/selection grid for a 'Meet' sport in a preferred embodiment.

DETAILED DESCRIPTION OF PREFERRED EMBODIMENTS

Figure 1A:
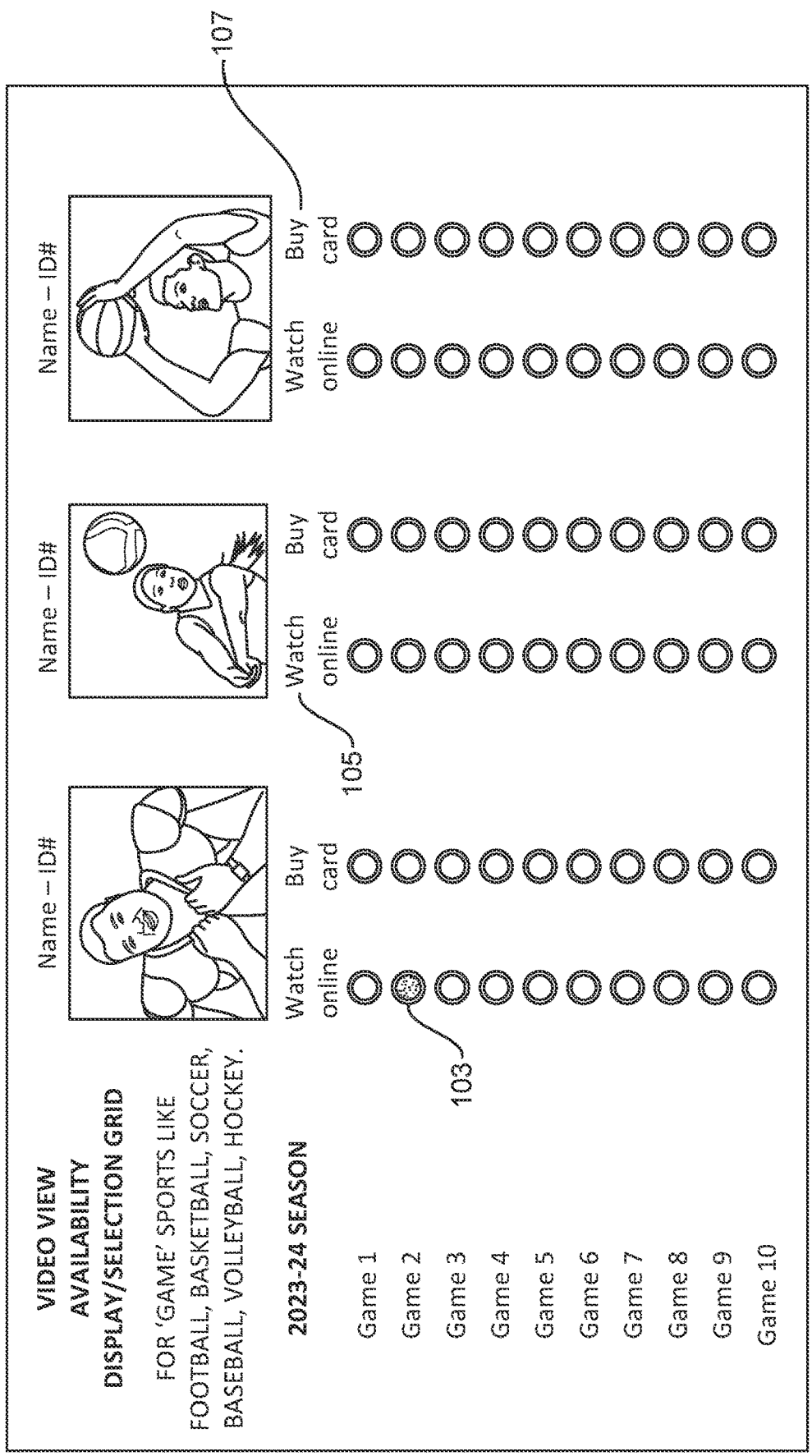
FIG. 1A is a schematic of an onscreen display/selection grid for a 'Game' sport in a preferred embodiment.

In FIG. 1A, a schematic of an onscreen video view availability monitoring display/selection grid for 'Game sports' in a preferred embodiment comprises a selection grid comprising athlete identities along one axis and sports event seasonal components along another axis and a coordinated grid of buttons. For example, at the top are a plurality of images of athletes registered in the system of instant invention wherein a football player 101 is in the leftmost position. These athletes are among the favorites of a fan who designated them for inclusion in the monitoring display/selection grid shown on fan's dashboard. The athletes pictured comprise an American football player on the left, a volleyball player in the middle, and a basketball player at right. As mentioned on the figure, 'Game' sports are those sports competitions comprising games during a season, such as a series of football games or a series of volleyball games. Accordingly, the competition seasonal components listed from top to bottom on left are numbered games to correspond to the participating athletes whose photos are arrayed above, thus comprising the selection grid display in coordination with the corresponding grid of buttons. Located within the left side of the display is the specification for the relevant sports season, i.e., the 2023-24 football season. Below the season listing is a numbered list comprising games 1 to 10 of the said season of football scheduled play. Said games typically occur with a home team and a visiting team within a conference. Participant athletes such as pictured above are well positioned to supply videos regarding their specific participation in said games. Said videos comprise said each pictured athlete speaking of their respective observations regarding said each specific game of the season in which they competed. Said juxtaposition of athletes and games forms a selection grid of buttons 103 useful for fans to assess availability and choose to purchase and view a desired video. This grid allows fans to accurately assess and individually select available videos recorded by a plurality of athletes regarding the several games of the season. It is understood that the display is scrollable, revealing additional athletes and buttons. Viewing said selected and purchased videos may enhance a fan's sports enjoyment over a season of sports play. The available videos for each game can comprise a pre-game video and/or a post-game video. The same game of the season can furthermore be represented by videos produced by several athletes, including athletes from opposing teams, adding to the fan interest and enjoyment. Said variety of athlete viewpoints provides instruction and enjoyment to a dedicated sports fan. The athletes also are prepared by instructions (not shown) to provide input for properly filling out templates for producing downloadable files yielding printed cards. Such cards (see FIG. 5) are typically comprised of an identification of the sport, the season, and the specific game referenced by said each card, along with the name and a photo of the video-recording athlete and a QR code linked to said video. The card is printed from an electronic file downloaded from the instant invention system after the fan pays a fee. The buttons positioned in double row below each photo of participating athlete, said buttons are indicators of whether an athlete has submitted/posted within system his video for a.) online viewing and/or his data for b,) said printable card for a specific game. In FIG. 1A, the lighted button 103 in the row 'Watch Online' corresponds to Game 2 and football athlete 101. Said lighted button comprises an alert for the monitoring fan. The alert informs said fan that the video is available for viewing. This alert is further discussed below regarding FIG. 1E. The pictured athletes are allowed by the system to decide the price they charge fans to view their respective videos (see FIG. 6). A template, when fully filled in (see FIG. 5), comprises the downloadable file used by a fan to print the card bearing the QR code linked to the athlete's video. The left row of the double row of buttons below each of the photos has the header 'watch online' 105. This indicates to a fan buyer that a lit button in this row indicates an athlete who has posted a URL as a link to his video for viewing online, i.e., on the fan's screen (see FIG. 3). The choices within the grid are applicable one by one. A fan can purchase one athlete's video for Game 2, for example, and a second athlete's video for Game 3, assuming those athletes do provide such videos to be bought. The button with the header 'Buy card' 107 is applicable when the athlete pictured above that button has posted a video regarding the specified numbered game aligned in grid, said posting typically on YouTube, said posting a submission by fan into the system of the URL of that YouTube stored video. Said URL can also be used to generate a QR code. Said QR code file is then input (see FIG. 5) to comprise the printable file for a card associated to said athlete and said game. The purchasing fan of a 'Buy card' button offering, said fan can download the file, print the card, and scan the QR to see the athlete speaking about the corresponding game of said sports season. These cards are a tangible collectible, reminding the fan user, upon later review of the card, about memories of the game, especially refreshed by the personalized highlights in athlete's observations per the video contents of the 'Buy card'-linked video.

Figure 1B:
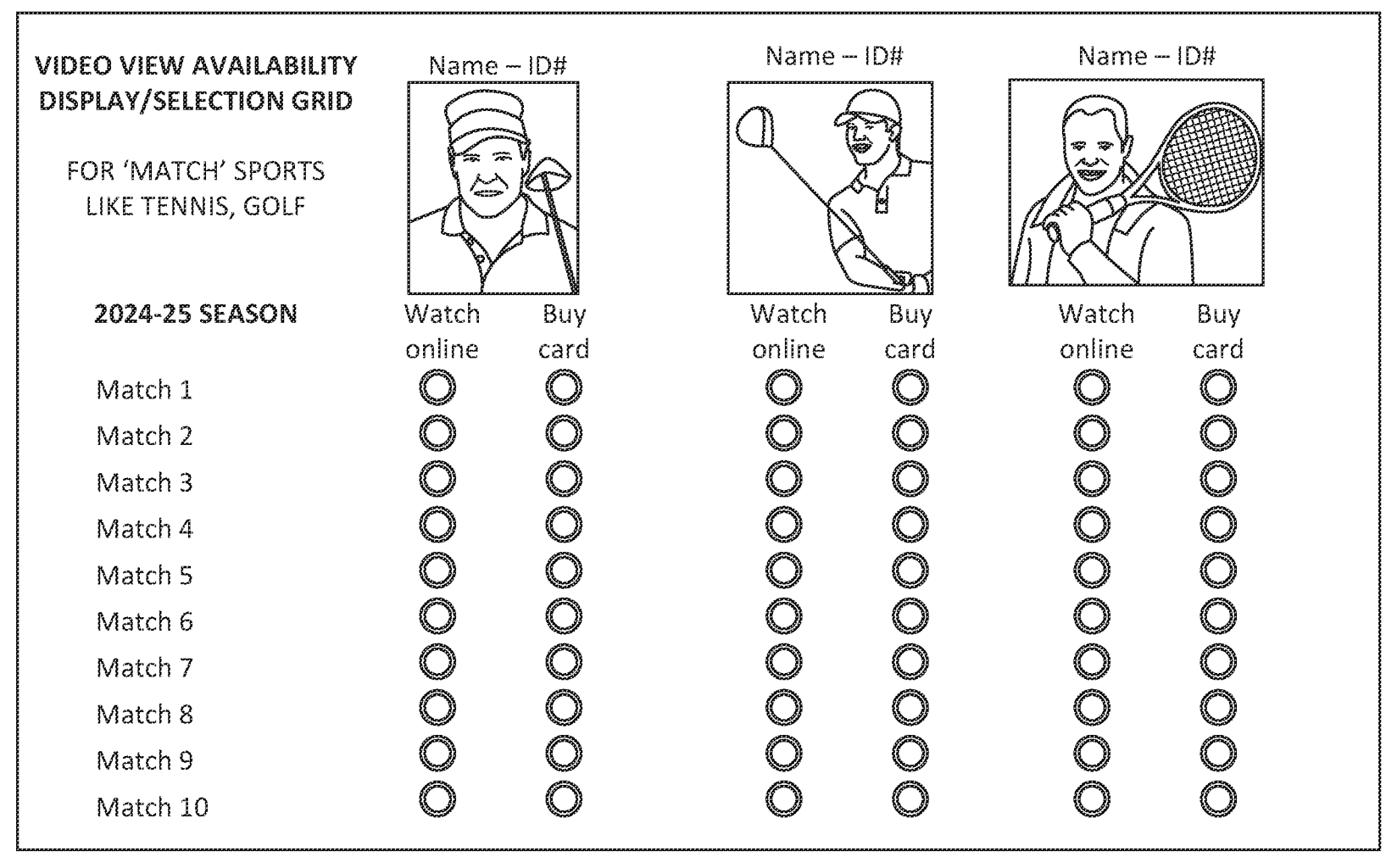

In FIG. 1B, a schematic of an onscreen video view availability monitoring display/selection grid for a 'Match sport' in a preferred embodiment comprises a selection grid comprising at top a plurality of images of athletes registered in the system of instant invention. These athletes are among the favorites of a fan who designated them for inclusion in the monitoring display. The athletes pictured comprise a golf athlete on the left, a golf athlete in the middle photo, and a tennis player in the right-side photo. As mentioned on the figure, 'Match' sports are those wherein competitions are known as matches, such as a tennis match or match play in golf. Accordingly, the competitions listed from top to bottom along the left axis of the grid are numbered matches to correspond to the photos of athletes respectively juxtaposed along top axis of the selection grid comprised of corresponding buttons.

Figure 1C:
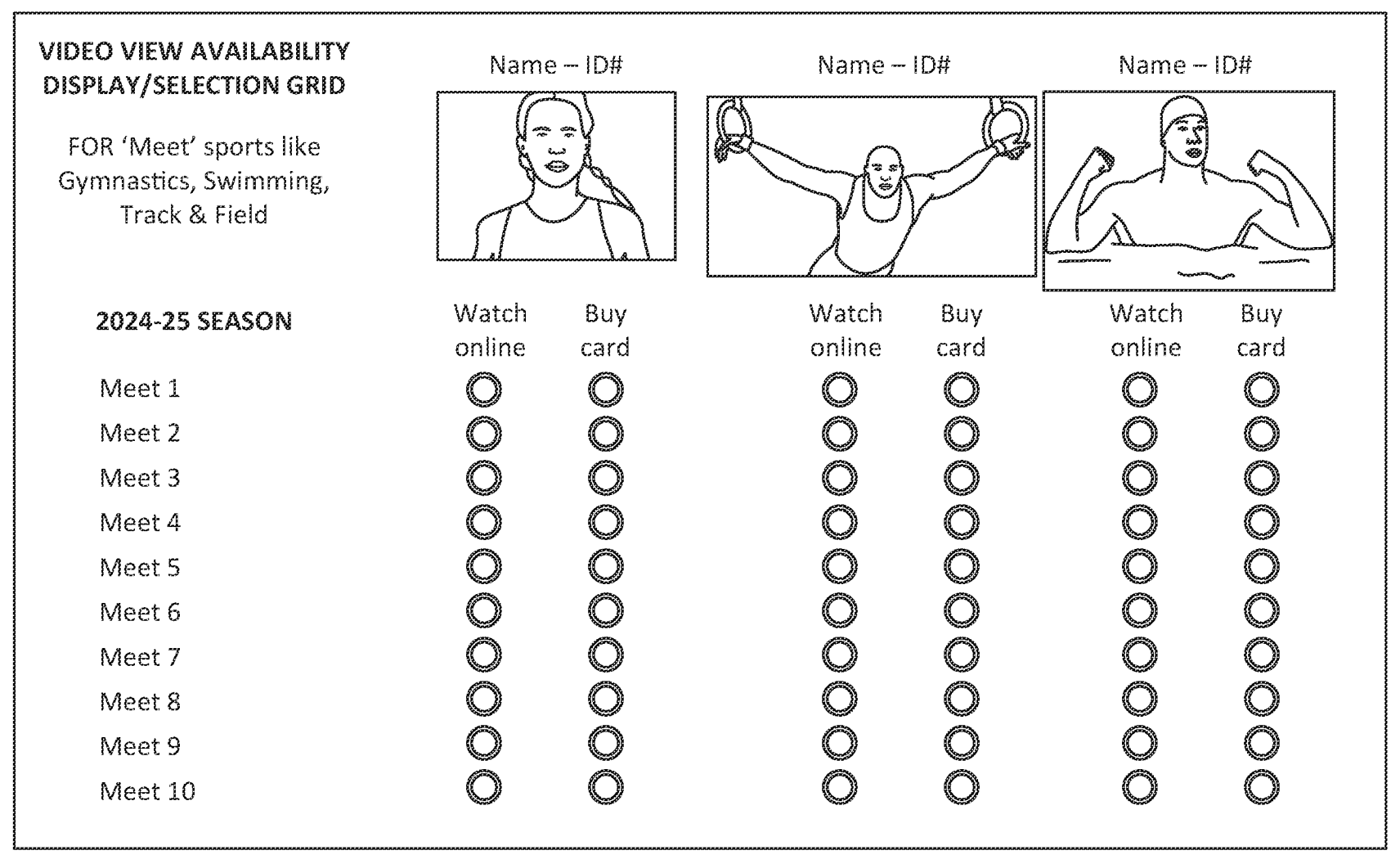

In FIG. 1C, a schematic of an onscreen video view availability monitoring display/selection grid for a 'Meet sport' in a preferred embodiment is shown comprising along the top axis of the selection grid of buttons a plurality of images of athletes registered in the system of instant invention. These athletes are among the favorites of a fan who designated them for inclusion in the monitoring/selection grid display. The athletes pictured comprise a track and field athlete on the left, a gymnastics athlete in the middle photo, and a competitive swimmer to the right. As mentioned on the figure, 'Meet' sports are those wherein sports event competitions are known as meets, such as a swimming meet, a gymnastics' meet, and a track and field meet. Accordingly, the competitions listed from top to bottom along the left axis of the grid are numbered meets to correspond to the athlete photos respectively juxtaposed above the grid of corresponding buttons. In a preferred embodiment, an athlete posting links to videos may wish to provide a plurality of videos for the same event or day of competition. To specifically identify such multiple postings for fans, the system allows athletes to assemble a listing wherein each of said multiple postings has a corresponding time/date label and an explanatory notation typed in by the athlete. For example, when a track and field athlete has entered multiple events within the same meet, said multiple events having multiple heats or races during the same day or week, and wherein said athlete has recorded multiple corresponding videos with links, the monitoring/selection grid display of buttons will have a lighted button corresponding to said athlete's photo and the Meet number, said alert indicating to fans that at least one video has been posted by said athlete regarding said meet. When said lighted button is clicked by the fan, the system responds with onscreen presentation of a listing from which the fan may select a desired item. In the track meet example, a sprinter running both the 100 meters competition and the 200 meters competition may enter a plurality of links to a plurality of her recorded videos, each presented in said listing to a fan as having a unique time/date label and an explanatory notation. For example, the athlete might submit a video with link comprising an explanatory notation: '100 meters heat 2' with the time/date label of '1 Aug. 23 at 9:35 am'. Said listing can also include a reference to a video with link comprising the explanatory notation: '200 meters semifinal' with the time/date label of '2 Aug. 23 at 5:24 pm' (see FIG. 7).

Figure 1D:
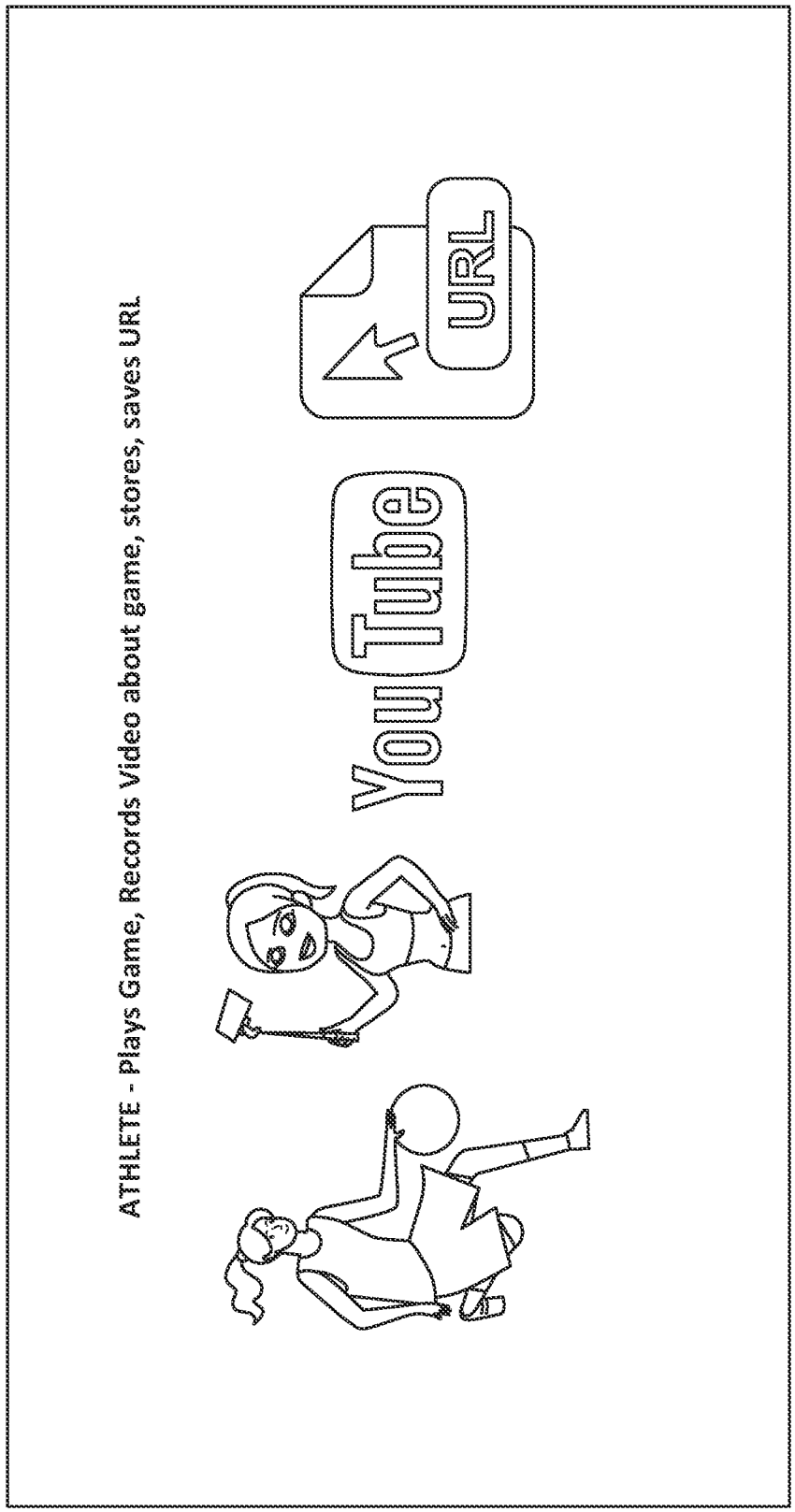
FIG. 1D is a schematic of actions of an athlete in a preferred embodiment.

In FIG. 1D is a schematic of actions of an athlete in a preferred embodiment. Said actions can be viewed as proceeding sequentially left to right, through steps of instant invention system in a preferred embodiment. The athlete typically registers within the system and then competes or prepares to compete in a game, meet, tournament, or match of an athletic season. Said athlete can be female or male, competing in a solo sport such as singles tennis, or a team sport such as basketball (left side image). Said athlete undertakes to record a video ($2^{nd}$ image from left) wherein said athlete self-records herself appearing and speaking before the camera. Optionally after editing the video, said athlete submits said video for online storage, such as at YouTube ($3^{rd}$ from left image). Said athlete retrieves from YouTube the URL (right-side image) of said stored video, said URL for use in linking to videos of display grid.

Figure 1E:
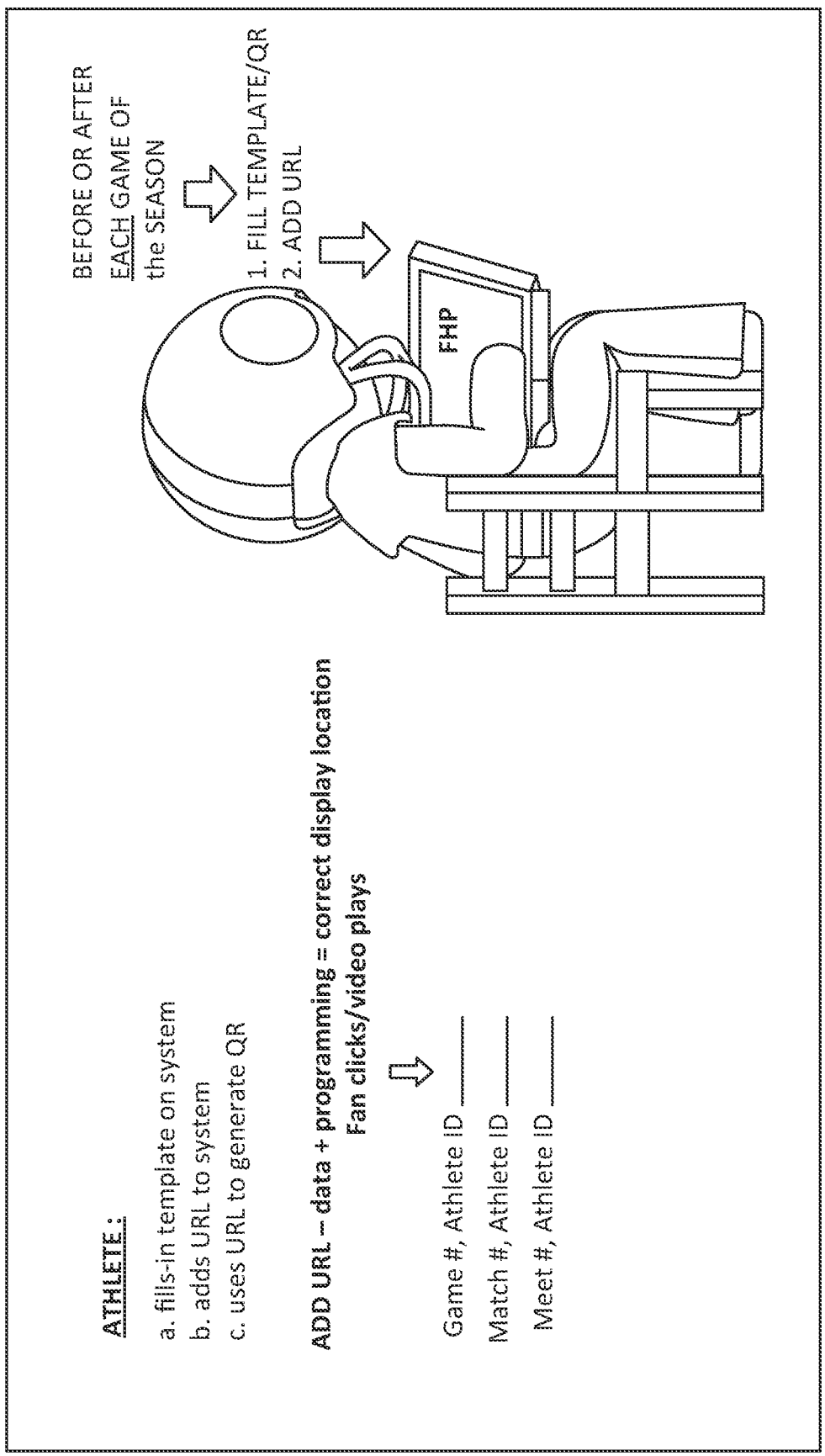
FIG. 1E is a schematic of actions of an athlete in a preferred embodiment.

In FIG. 1E is a schematic of actions of an athlete in a preferred embodiment. An athlete is shown seated at a computer and interacting with said computer of system. Text associated to said image of a seated athlete conveys the context of said actions. Typically, said athlete registers within said system of instant invention, and logs in and proceeds to input data related to the URL mentioned in discussion for FIG. 1D. Said URL for example, can be entered by said athlete into a system data field wherein programming established for said URL a link to said athlete's ID number and also to the numbered sports event regarding which the said athlete has provided videoed observations. As text of FIG. 1E clarifies, the system programming links said URL input by athlete to template data and other data within the system. Said linking by the said programming assures that when the corresponding grid button is clicked, said URL is activated to retrieve for the paying fan a view of the said video (see FIG. 1A). For example, where said competition is a football game of the 2023-24 season, and wherein said football athlete 101 of FIG. 1A has recorded a video discussing his observations in playing in said Game 2, said system programming provides a paying fan who then clicks on said corresponding button (the lighted button in FIG. 1A) a view of the associated video. In FIG. 1E, the wearing of the helmet by the seated figure is meant to convey the concept that the athlete himself can perform the filling of the template and the posting of the URL and other steps within instant invention preferred embodiment. For example, a diligent athlete regarding each game of a football season in which he competes, said diligent athlete can prepare, store, and post a link to a pre-game video, and prepare, store, and post a link to a post-game video. Optionally, an athlete registered within the system can elect to have a manager assist with these duties.

In a preferred embodiment, as regarding the 'Buy card' choice in the grid display, the correctness of display can be confirmed by fan when system presents to fan an image of said card, said presentation pre-purchase. The fan is thus enabled to examine the particulars of the image of the filled-in template, such as reviewing the data of the sport, year of season, athlete's photo, athlete's name, and the listed opponent. When fan finds all is correct as to being the data fan anticipated for the card he is looking to purchase, said fan can then proceed to complete the purchase.

Figure 2:
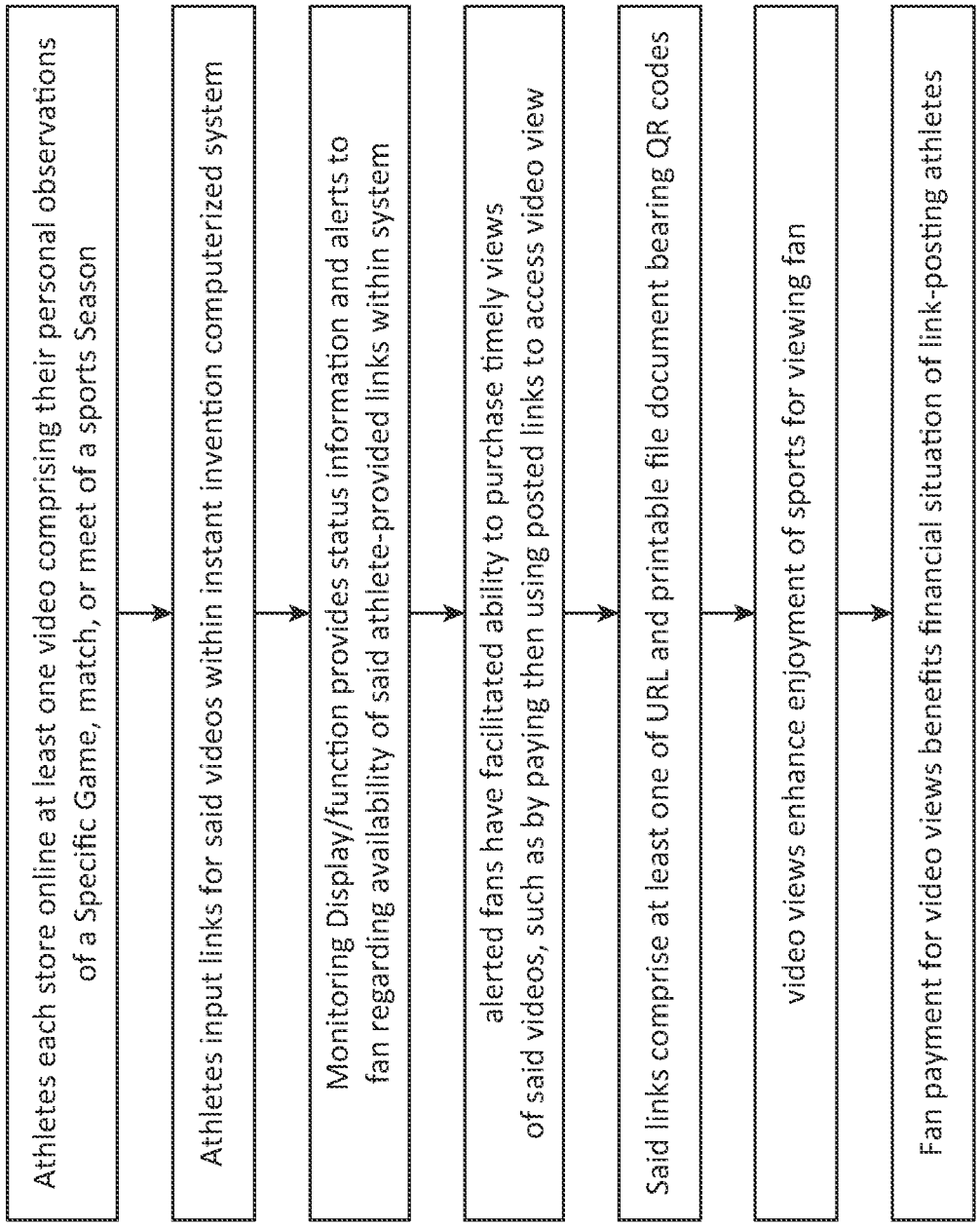
FIG. 2 is a list of steps of a preferred embodiment.

In FIG. 2. steps of a preferred embodiment are listed, including a first step wherein system-registered athletes each store at least one video online, such as at YouTube. Each of said videos comprise the specific athlete's personal observations about a game or match or meet of a current season of sport. In a second step, the athletes each input within instant invention computer system at least one link to said stored video. In a third step, a monitoring function, such as an updatable display (see FIG. 1), provides fans with availability status information and alerts regarding said athlete-provided videos and links within the system. Said status can be within a selection grid as to which game, match, or meet of said season has a posted video and link indicating an associated video in which said inputting athlete appears. Said actionable alert can be an interactive email to fan who earlier expressed an interest in said athlete's postings. Optionally, fan can click within email to execute purchase. An alert can be an online indicator within display (see FIG. 3). In a fourth step, alerted fans have a facilitated ability to purchase timely views of said videos. The timely aspect can refer to fan's interest in immediately viewing a newly posted link to a newly posted video by a favorite athlete regarding a soon upcoming or recent game. In a fifth step said newly posted link can comprise one of a URL linked to an online-viewable video of said fan-favorite athlete, or a printable document comprising a QR code linking to a video of said athlete. In a sixth step said video views purchased by said fan can serve to enhance the enjoyment of sports for said video-viewing fan. In a seventh step a fan payment for access to said enjoyable view of athlete's video can benefit the financial circumstances of said athlete appearing in said video.

Figure 3:
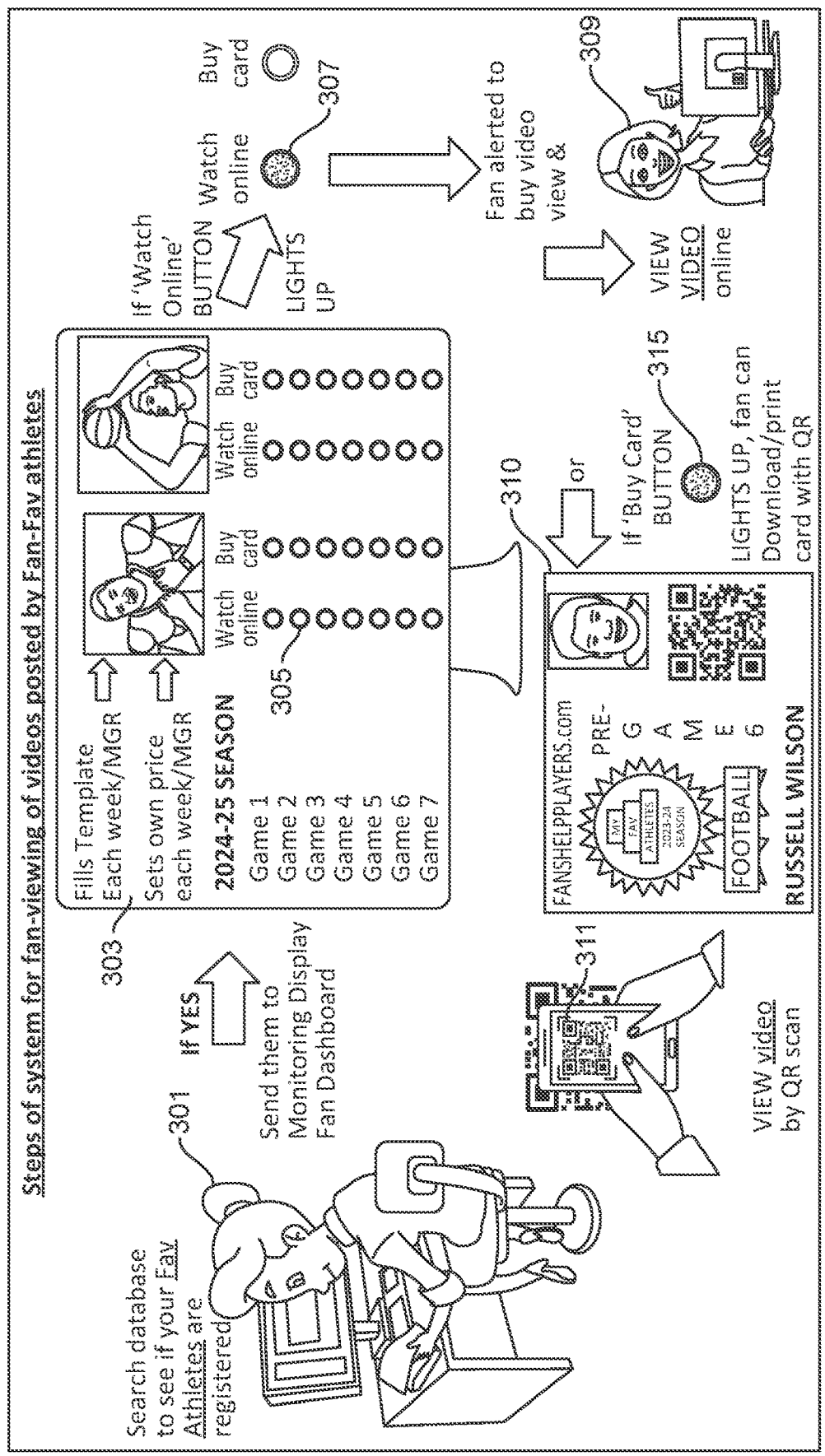
FIG. 3 is a schematic of a preferred embodiment comprising fans accessing video viewing.

In FIG. 3. a schematic of a preferred embodiment, fans proceed through steps to access viewing of videos, which videos comprise recorded appearance and speaking by fan's favorite athletes. The woman 301 seated at system computer at left has in her left hand a list she compiled of her favorite athletes. She is performing a search of the database of instant invention system to discover which of these, her favorite athletes, are registered within said system. When she finds a registered favorite athlete, she sends an instruction to the system to display said favorite athlete's image within a monitoring display/selection grid 303 on her fan's dashboard screen. Within the dashboard display 303 are two images of athletes, each of whom are registered within the instant invention system and have been forwarded as instructed by said system-registered user 301. The display comprises a grid of buttons 305 aligned in coordination to athlete images along the top axis of the grid and numbered games along the left-side axis of the grid. Said list of games relates to a stated season of sport (herein 2024-25 season). The buttons are programmed to light more brightly 307 when a favorite athlete posts a corresponding link to a video. This brightly lit button alerts the watching user that the athlete corresponding in the display to said brightly lit button has posted a link to a video corresponding to the grid aligned game, said video wherein contents comprise said athlete appearing and speaking his observations about the game number corresponding in the grid to the position of the brightly lit button. As mentioned in the text of FIG. 3 at bottom right, the fan observing said brightly lit button is alerted of an opportunity to purchase an online view of said video. Said view in this example corresponds to the text at bottom of FIG. 3 'VIEW VIDEO online' wherein a woman user 309 of system has purchased said view and is looking at her computer screen to see the said video play online. It is understood that other displays are contemplated to be used instead of lit lights. To signify availability of a view of a video, a variety of rows of icons are envisioned to be used, such as a checkmark or a star or an empty circle when not available with a filled in circle when available. An illustration is shown at bottom center of FIG. 3 comprising a printed card 310 produced by printing a downloaded digital file from the system computer of instant invention. Said card identifies the athlete by name, photo, and ID number. The athlete's sport 'Football' is listed on the card as well as the season 2023-24 and the game number 6. Said athlete, who would be visible in display 303 if fan scrolls to the right in the display 303, said athlete from card 310 has provided a QR code linked to a video of his observations of said game 6. A fan user can scan said QR code with fan's cell phone 311 yielding a view of the contents of the said linked video in which athlete Russell Wilson from card 310 appears. The user had received an alert of the availability of said video to be viewed when user did scroll the display, said alert comprising a lighted condition of the corresponding 'Buy card' button 315 in the display (here in FIG. 3, said button 315 image was moved from the display to a position in FIG. 3 near the card 315, said move for convenience of explaining FIG. 3, i.e., for illustrative purposes.

Figure 4:
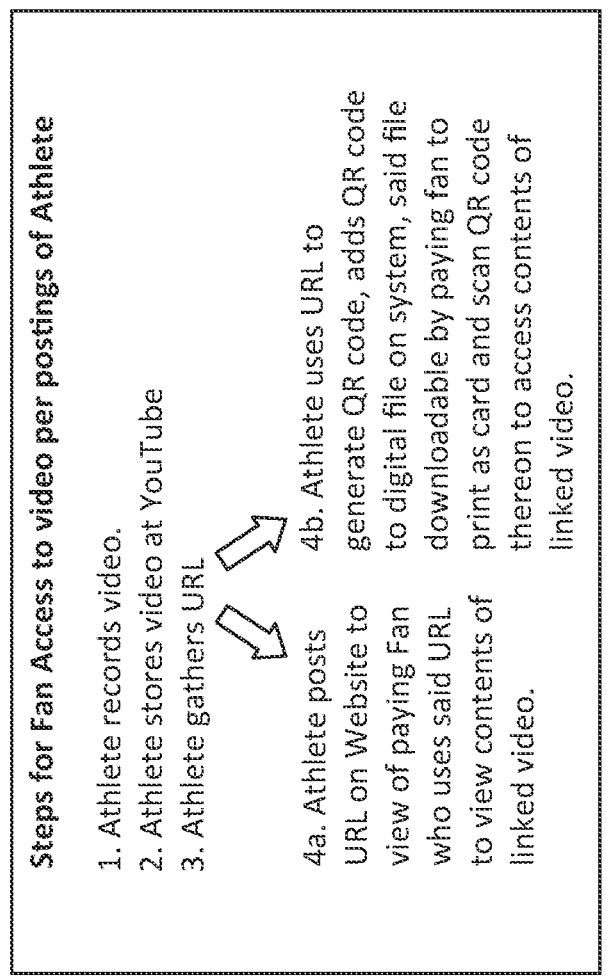
FIG. 4 is a list of steps of a preferred embodiment.

In FIG. 4 is presented a list of steps with associated arrows. In step one, an athlete undertakes to record a video, such as by selfie method wherein athlete uses his own cell phone on the 'record video' setting. He points said cell phone camera to his own face as he speaks about his observations of a game of the current sports season. In step two, said athlete posts said video on YouTube. In a third step said athlete gathers from YouTube the corresponding URL. Two options are available to said athlete in possession of said URL as arrow markers indicate. In the first option (left pointing arrow to 4a), said athlete can post the URL within the instant invention computer system, said posting allowing paying user to see a corresponding lit 'Online view' button in the grid. Said paying user can click said button to cause the said video to play on user's computer screen. In the second option (right pointing arrow to 4b.), the athlete can use the URL to generate a QR code, such as by using the online free Adobe QR generation service of Adobe Express. Th athlete then can post said QR code at the instant invention's card template. When the athlete has filled all needed data to the card, the athlete submits said template to produce a downloadable digital file. The card when printed comprises the QR code as linked to the video. Upon fan scanning the QR of the printed card, the video contents become visible to fan, said contents comprising the appearance of said athlete speaking his observations regarding said sports event.

Figure 5:
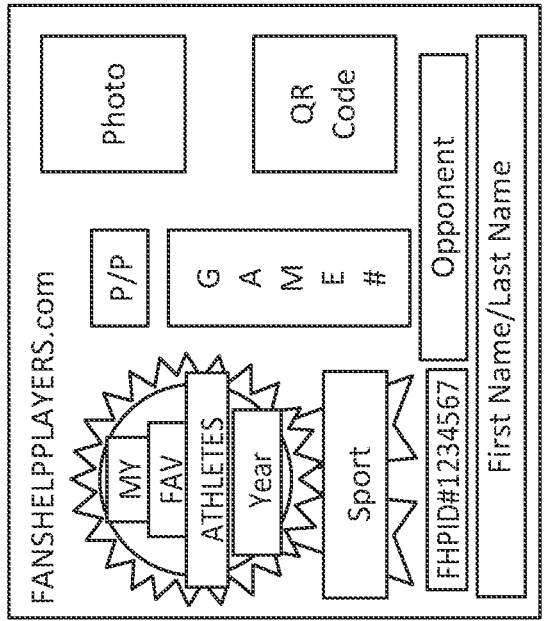
FIG. 5 is a schematic of a preferred embodiment comprising a template.

In FIG. 5 is a schematic comprising a template of a preferred embodiment. Said template is shown with associated instructions. This template is filled by athlete on screen according to the instructions. The card printed from the digital file of said filled template comprises a seasonal badge in reference to a season of sports play, such as a football season (typically September to January or so). Within the card is a logo at the top left of card, and a gold badge image with red ribbon. The gray rectangles and squares with text signify the sites for data display/input. For example, just below the red ribbon is a gray rectangle on which appears the athlete's identification number in the system of instant invention: 'FHP ID #1234567'. At the bottom of the card is a gray rectangle for the athlete's first name and last name, and above that is a rectangle where athlete can type in the name of or description of the opponent in the referenced game. Over the red ribbon area of the badge image is a gray rectangle for athlete to indicate the name of his sport. Just below the word 'Athletes' on the badge image is a gray rectangle for the athlete to enter the year of the reference season of sport. The four gray colored spaces to the right upper portion of the card are, in clockwork order from the top-right: space for athlete's photo, a QR code linked to a stored video, the word 'GAME' (in the case of a Game sport) typed vertically with hashtag number symbol below, and finally a gray rectangle with letters P/P which refer to Pre- and Post—which items can refer to time of recording of a video as before (Pre) or after (Post) a game/match/meet of the sports season. Based on the programming of the computer, the athlete can follow the instructions listed and correctly enter data in the gray box areas. For example, instruction 1 for the P/P gray rectangle directs the athlete to choose either Pre or Post or to leave the box blank. The second instruction directs the athlete or his manager to apply one of the words: GAME, MATCH, or MEET. The third instruction directs the athlete or his manager to apply numerals to indicate the Year. The fourth instruction directs the athlete to input the name of the relevant sport to the indicated box, such choice clickable from a dropdown menu. The fifth instruction directs the athlete to choose a number to appear in the location of the symbol #. The typical football season has twelve games or so. Thus, the number could be any from 1 to 12 in that scenario. The sixth instruction directs the athlete to type in a description of the opponent in said game, match, or meet. The seventh instruction reminds the athlete that storage of data can come at a cost, and therefore the athlete can submit 5 filled templates for free, but then must pay a $0.30 fee to post each subsequent template after the initial 5. The eighth instruction reminds the athlete about his choices in setting the price for fans to view one of his online videos. The ninth instruction reminds the athlete of his choices in setting the price for a fan to view one of athlete's videos comprising user scanning a QR code from a downloadable file printed card. In use, said card when fully filled with appropriate data input by athlete, and posted within the computer of the system as a printable file, at least some of the data of said file is automatically assessed per system programming. Key data appearing on the card, such as the ID number of the athlete and the game number, said data is also typically applied automatically to associate to the specific URL in deriving correct placement of an alert lighted button within the selection grid, as disclosed herein. The selection is enabled when the correct button within the grid of buttons is thus lit in the game-specific row beneath the photo of the correct specific athlete. The monitoring fan is thus alerted and enabled to timely purchase a view of the video as corresponds to the said lit button (see FIG. 3).

Figure 6:
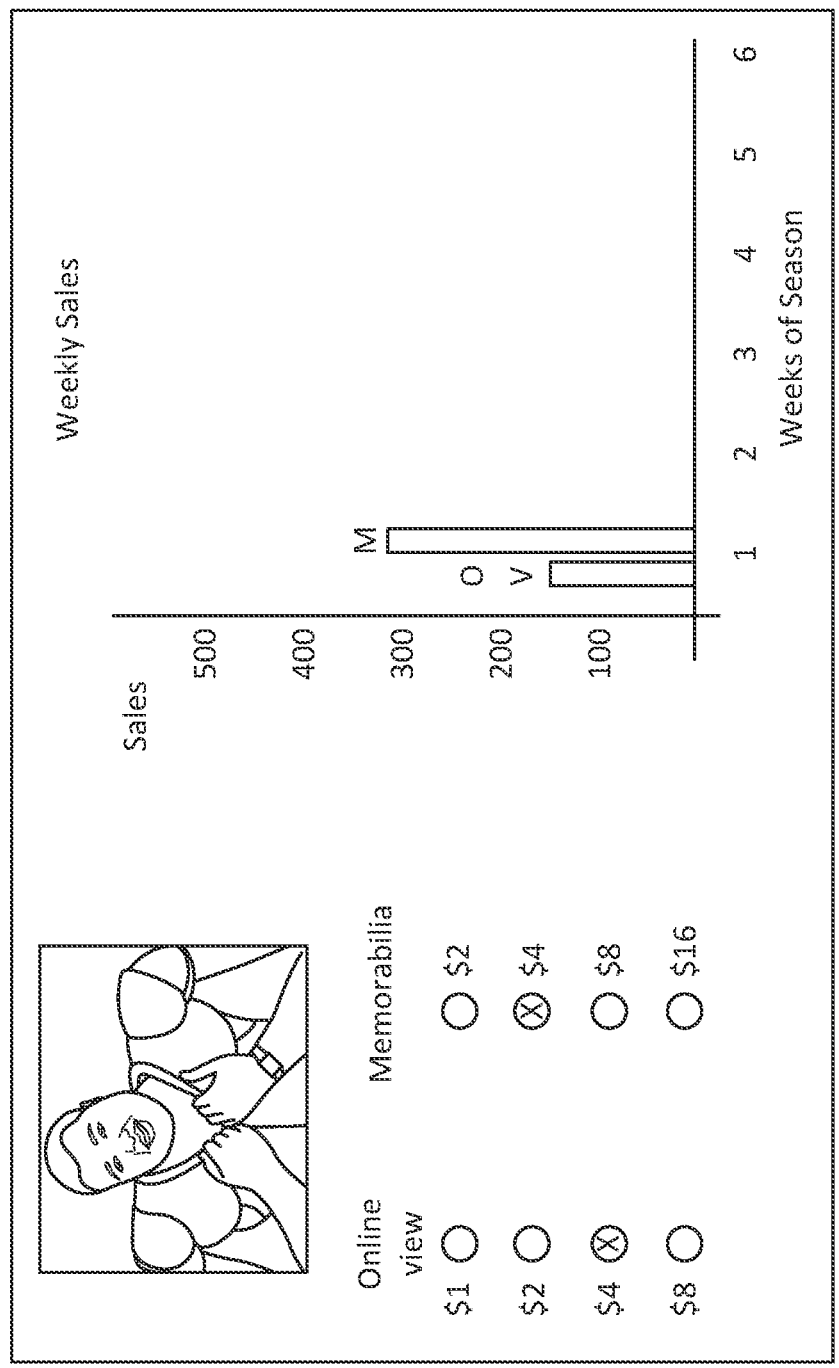
FIG. 6 is a schematic of a preferred embodiment comprising setting of price and a sales graph.

In FIG. 6 is presented a schematic of a preferred embodiment comprising price setting and a sales graph. The athlete pictured is registered by name and ID number within the computerized system of instant invention. The athlete uses the price-setting array, shown here as it would appear on his dashboard screen of system, to set prices respectively for his weekly video regarding his observations of the football game he played in that week. For example, in this figure the athlete has set his price for a fan to view said video online as $4. Athlete has also set the price for fans to download his card, a form of memorabilia, also at a price of $4. In the corresponding sales graph, as also presented by system programming to the view of said athlete on his dashboard screen, the athlete can see that approximately one hundred fifty fans purchased the online view of his week 1 video. Meanwhile, approximately three hundred fans purchased his memorabilia card with QR code to be scanned when fan wishes to see said QR-linked video contents. By adjusting his pricing in reference to results shown graphically week by week, said athlete can attempt to optimize his sales to fans. It is understood that pricing by athlete within instant invention optionally can be done using any of several price selection means and displays. For example, an athlete can click on a dollar amount from a dropdown menu or simply input by typing a specific dollar value. Similarly, it is understood that the sales volume graph can present calculated percentages as increase or decrease overtime.

Figure 7:
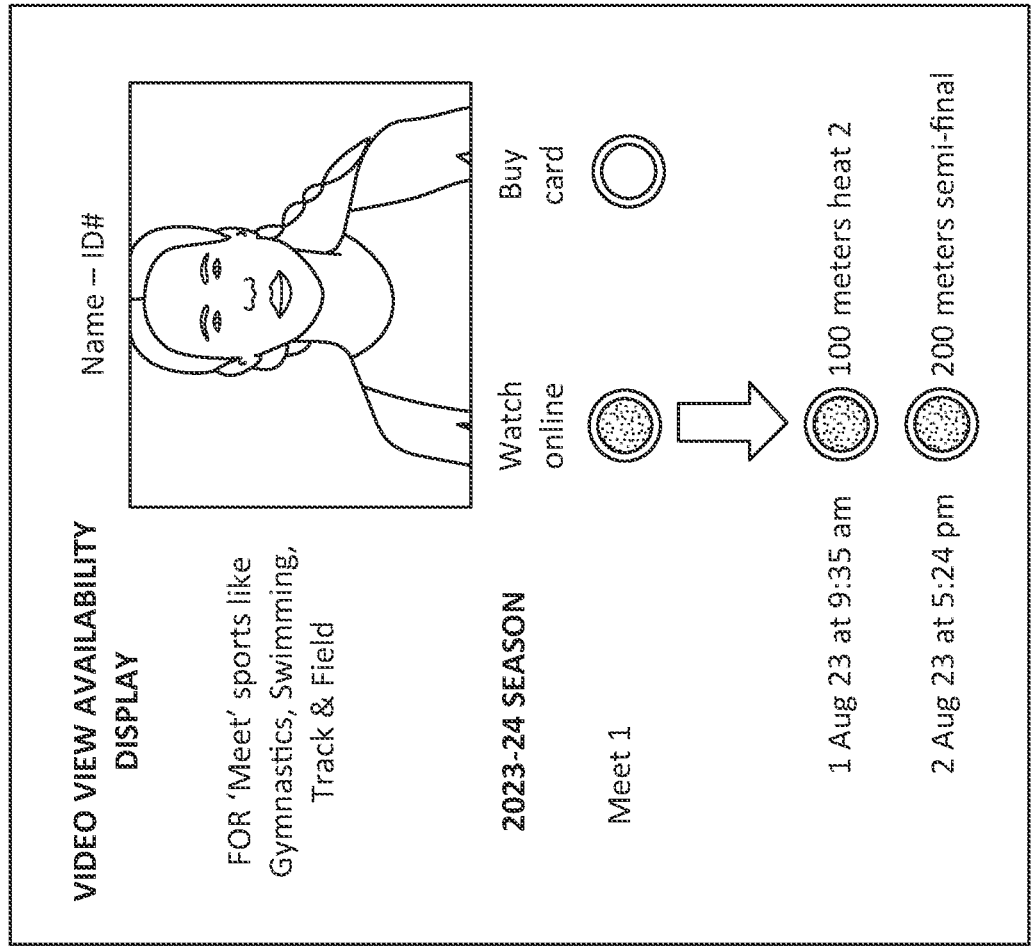
FIG. 7 is a schematic of a preferred embodiment comprising time/date label and explanatory notation.

In FIG. 7, a schematic of a preferred embodiment comprises use of time/date labels and explanatory notations. For the pictured athlete competing in a season of track meets, a portion of a Video View Availability Monitoring Display/Selection Grid is shown. The listing at left of 'Meet 1' is aligned to the lighted button under the words 'Watch online' as located beneath the photo of said athlete. This arrangement comprises for the monitoring fan an alert specifying that the said athlete has posted at least one video for Meet 1 of the said season. Fan knows therefore that at least one video is available for purchase of a view. Said fan in clicking said 'Watch online' Meet 1 button is allowed to view onscreen an expanded list, displayed for convenience in FIG. 7 as beneath the point of the arrow. Said expanded list comprises two additional lighted buttons, each with associated time/date label and explanatory notation. These additional listings are arrayed in time/date order. This expanded list indicates to the said monitoring fan that the athlete has recorded her observations of two of her races within said Meet 1. The fan might wish to pay to view one or both videos, understanding that these videos comprise observations of the athlete regarding the said two races in which athlete competed. Furthermore, said videos make it possible for a fan to follow the sequence of said specific athlete's competing in said sports event, a track meet. For example, by clicking the lighted button corresponding to the 100-meter race, the fan can view the said race from the morning of the first of August. Subsequently, the fan can click the button corresponding to the second of August race, i.e., the semi-finals of the 200-meter race. In this way, the fan is proceeding in the same time/date sequence as athlete did in competing. It is understood that further time/date labelled videos can comprise additions to the list, also listed in sequence athlete competed. Each such additional listing would comprise associated time/date label and explanatory notation for races by said athlete within said same meet.

Such additional videos provide the fan further opportunities to view more of the sequence of competing of said athlete in the meet. It is understood that said sequential viewing of such stored videos within instant invention can apply to a variety of sports for system-registered athletes. Being able to thus follow a favorite athlete along their path of competition within an event is a useful way for a paying/viewing fan to have an enhanced enjoyment of sports, while providing said athletes a financial benefit. Furthermore, for those fans choosing the 'Buy card' option for said sequential views of an athlete's competition within a sports event, said fans will thereby accumulate a series of printed cards with QR codes. Said cards or memorabilia will allow said 'Buy cards fans' to later refresh their memories of said sequence of their favorite athlete's competition experience. The fan can re-scan said QR codes in same time/date sequence as happened for athlete, and thus re-view the sequential experience weeks, months or years later. Where a friend made the recordings of the actual race in which athlete competed, i.e., said friend recording the race during time when the athlete competed in the race, and where then the athlete added to each said race video a selfie addition comprising a recording of athlete's own observations of the said race, then said competition/observation videos (COVs) become a part of the sequential record available to fans. Said accumulated COV sets of videos over the course of a track meet are understood to be a more complete and even better refresher of memory for the sequence-viewing fans for various athletes of the sports event. Such athlete-specific event-specific sequential records are understood to provide enhanced viewing opportunities in various sports per instant invention. Examples of instant invention sequential sets of athlete-specific COVs are envisioned for use in fan viewing of golf tournaments such as the Master's Golf Championship, also in international sports events such as the summer or winter Olympics, or in global competitions such as the Soccer World Cup.

Although the invention has been described in considerable detail in language specific to structural features, and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated and can be made without departing from the spirit and scope of the invention.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A computerized system for providing enhancement of enjoyment of sports events for system-registered users while benefiting the finances of system-registered athletes, the system comprising:
   at least one database;
   a computer memory configured to store instructions;
   a processor configured to execute the stored instructions to be configured to accomplish the following:
   provide registration with the system for an athlete, where the system assigns the athlete a registration identification (ID) number and the athlete provides the system with at least the name and a photo of the athlete being registered;
   provide for the registered athlete an ability to provide the system with one or more internet uniform resource locator (URL) and/or to provide or have the system provide a quick response (QR) code, where each URL and QR is associated with a specific video created by or for the athlete, where the content of the specific video shows at least the athlete discussing a performance by the athlete, and/or observations by the athlete, with regard to a specific sports event;
   receive from the registered athlete one or more URL, where each URL is associated with a specific video created by or for the athlete and is stored in the Database;
   provide registration with the system for a registered user to be able to access any available video for any system registered athlete;
   receive from the registered athlete one or more QR code, or provide one or more QR code for the athlete, where each QR code is associated with a specific video created by, or for, the athlete and the QR code is stored in the database;
   receive from the registered athlete a price for a registered user to view a specific video directly online by the user, and/or a price for the registered user to download from the system a printable file to create for the registered user a card having at least a name and an image of the registered athlete and a QR code that is scannable from the card by the registered user to allow the registered user to view the specific video;
   provide information to a registered user, where the information is stored by the database and is associated with one or more user selected registered athlete, where the information provided is configured to be displayed on a user device, where the displayed information includes an image and/or an identification of one or more selected registered athlete and for each respective selected registered athlete there is displayed a description of one or more sports event associated with each respective selected registered athlete, and where for each one or more sports event there is displayed a selectable icon that indicates (i) whether a video associated with the respective selected registered athlete is available for direct online viewing by the registered user, and/or (ii) whether information associated with a downloadable card having a scannable QR code associated with a video is available for the registered user;
   receive from the user device a selection of one or more displayed icon for the registered user for an available video to purchase for the registered user to directly view online a video associated with the each one or more selected icon for any registered athlete, and/or receive from the user device a selection of one or more displayed icon by the registered user for an available video to purchase for an ability for the registered user to download a file for a printable card associated with the each one or more selected icon for any registered athlete;
   receive a payment from the registered user each selected icon for an available video, where the registered athlete previously provided the system with a price for viewing each respective available video associated with a respective selected icon;

subsequent to receiving a payment from the registered user for a respective available video associated with a selected icon for viewing the respective video directly online, provide the registered user with a link containing a URL for the available video, where the URL was previously provided to the system by the registered athlete; subsequent to receiving a payment from the registered user for a respective available video associated with a selected icon for a downloadable file for a printable card having a scannable QR code for a registered user to use to be able to view the respective video, provide an ability for the registered user to be able to download the file; and provide payment to an athlete associated with all payments received from the registered user for each selected icon for an available video, where the payment provided to the athlete is at least some portion of each payment received from the registered user.

2. The system of claim 1, wherein the registration for the athlete further comprises a brand ambassador contract suitable to meet requirements under name, image, likeness (NIL), guidelines.

3. The system of claim 1, wherein the specific video includes content recorded by athletes from opposing teams.

4. The system of claim 1, wherein the specific video is a pre-game video.

5. The system of claim 1, wherein the specific video is a post-game video.

6. The system of claim 1, wherein the specific video is at least one video of a listing of videos comprising a number of related videos.

7. The system of claim 6, wherein the number of related videos are each a different event at a same sports event competition.

8. The system of claim 6, wherein the listing of videos are arranged in sequential time.

9. The system of claim 1, further comprising an alert configured to notify the registered user that a specific video is available.

10. The system of claim 9, wherein the alert is in the form of an email notification.

11. The system of claim 10, wherein the email notification includes an ability for the registered user to purchase the specific video directly within the email notification.

12. The system of claim 1, further comprising an alert configured to notify the registered user when any video is available from a specific athlete.

\* \* \* \* \*